United States Patent [19]
Yaniger

[11] Patent Number: 5,847,639
[45] Date of Patent: Dec. 8, 1998

[54] LAYERED PRESSURE TRANSDUCER LAND METHOD FOR MAKING SAME

[76] Inventor: Stuart I. Yaniger, 2402 Katherine Ave., Ventura, Calif. 93003

[21] Appl. No.: 939,335

[22] Filed: Sep. 29, 1997

Related U.S. Application Data

[63] Continuation of Ser. No. 198,149, Feb. 17, 1994, abandoned.

[51] Int. Cl.$^6$ .................................................. H01C 10/10
[52] U.S. Cl. .............................. 338/99; 338/114; 338/92; 338/47
[58] Field of Search ............................... 338/99, 114, 92, 338/47

[56] References Cited

U.S. PATENT DOCUMENTS

| | | |
|---|---|---|
| 3,212,043 | 10/1965 | Johnson . |
| 3,806,471 | 4/1974 | Mitchell . |
| 4,017,697 | 4/1977 | Larson . |
| 4,155,262 | 5/1979 | Wong et al. . |
| 4,163,204 | 7/1979 | Sado et al. . |
| 4,268,815 | 5/1981 | Eventoff et al. . |
| 4,314,228 | 2/1982 | Eventoff . |
| 4,315,238 | 2/1982 | Eventoff ..................................... 338/99 |
| 4,489,302 | 12/1984 | Eventoff . |
| 4,492,949 | 1/1985 | Peterson et al. .......................... 338/114 |
| 4,495,236 | 1/1985 | Obara et al. .............................. 428/172 |
| 4,503,416 | 3/1985 | Kim . |
| 4,529,959 | 7/1985 | Ito et al. . |
| 4,739,299 | 4/1988 | Eventoff et al. ............................. 341/5 |
| 4,745,301 | 5/1988 | Michalchik . |
| 4,794,366 | 12/1988 | Sakamoto . |
| 4,933,660 | 6/1990 | Wynne . |
| 4,996,511 | 2/1991 | Ohkawa et al. ......................... 338/114 |
| 5,302,936 | 4/1994 | Yaniger . |
| 5,305,644 | 4/1994 | Ehrreich .................................... 73/774 |

FOREIGN PATENT DOCUMENTS

| | | |
|---|---|---|
| 1039832 | 10/1953 | France . |
| 1107362 | 3/1967 | United Kingdom . |
| 2042188 | 9/1980 | United Kingdom . |
| 2134320 | 8/1984 | United Kingdom . |
| 2064873 | 9/1984 | United Kingdom . |

OTHER PUBLICATIONS

Patent Abstracts of Japan, vol. 008 No. 269 (P319), Dec. 8, 1984 & JP, A,59 135581 (Toshiba KK) Aug. 3, 1984.
Patent Abstracts of Japan, vol. 003, No. 018, (E–091), Feb. 16, 1979 & JP,A,53 145655 (Toshiba Corp.) Dec. 19, 1978.
N. Maalej, et al., "A Conductive Polymer Pressure Sensor," paper delivered at IEEE Engineering In Medicine & Biology Society 10th Annual International Conference CH2566–8/88/00000—0770 (1988).

*Primary Examiner*—Michael L. Gellner
*Assistant Examiner*—Karl Easthom
*Attorney, Agent, or Firm*—Brooks & Kushman P.C.

[57] ABSTRACT

A variable resistance transducer responsive to an applied pressure including a smooth resistive layer on a flexible substrate and deposited thereon by printing or imaging technology, small points of nonconductive or semiconductive material, and resistive interdigitating fingers where in one finger is a wiper so that position on the resistive layer can be sensed.

3 Claims, 5 Drawing Sheets

LAYERED PRESSURE TRANSDUCER LAND METHOD FOR MAKING SAME

This is a continuation of application Ser. No. 08/198,149 filed on 17 Feb. 1994, now abandoned.

BACKGROUND OF THE INVENTION

1. Field of the Invention.

This invention relates generally to transducers responsive to changes in applied pressure and more particularly to a layered, pressure sensitive, variable resistance composition and method for making the same.

2. Description of Related Art.

Pressure sensitive resistors are known which comprise two conductive layers which sandwich a fibrous or sponge-like layer containing a resistive material. As the two conductive layers are compressed together, the number of electrically conductive paths through the sandwiched resistive layer volume increases, thus decreasing the electrical resistance. While these types of resistors have been used for a number of years, they are accompanied by a number of problems pertaining to thickness, resiliency, and consistency. In these types of devices, the resistive layer must be resilient enough to force the conductive layers apart when the compression force is released. The resiliency of the fibrous or sponge-like layer decreases with use causing a degeneration in the operation. Furthermore, the resistive layer must be relatively thick to provide a dynamic range of resistance and the consistency of provide a dynamic range of resistance and the consistency of the fibrous or sponge-like layer is less likely to be repeatable from device to device. Finally, the manufacturing of such a device is labor intensive and time consuming.

An improved, but not entirely satisfactory pressure sensitive resistor, is described in U.S. Pat. No. 4,315,238 issued Feb. 9, 1982, to Eventoff, now assigned to the assignee of the present invention. Thick film technology is employed wherein a semiconductive layer is formed by impregnating a conductive resin with coarsely ground semiconductive or insulating particles to obtain a resin with randomly spaced microprotrusions. The resin is screened onto a flexible substrate and cured in an oven. The semiconductive layer is arranged adjacent to at least one contact layer of either conductive or semiconductive material. Applied pressure to the flexible substrate causes the microprotrusions of the semiconductor layer to make contact with the contact layer providing an electrical path therebetween. With lightly applied pressures, only the tallest microprotrusion peaks provide a conductive path. As applied pressure is increased, more and more of the microprotrusions provide contact between the two layers. The more contacts between the two layers, the lower the electrical resistance. Thus, variable resistance occurs because of a greater or a lesser number of surface contact locations.

While an improvement over prior techniques, this system suffers from its own drawbacks. Screening the impregnated resin uniformly onto the substrate can be labor intensive and is not the most controlled process. Additionally, the single layer of resin must not only have a consistent resistivity, but must also have a consistent distribution of the microprotrusions. Furthermore, since these types of devices are impregnated with a carbon like material, they are opaque and not suitable for transparent transducers.

It can be seen then that an improved pressure sensitive resistor and method of making the same is needed that is easy to fabricate, is consistent and repeatable from device to device, and employs readily available materials.

It can also be seen that improved devices and methods are needed which are transparent and may be illuminated from the rear.

SUMMARY OF THE INVENTION

To overcome the limitations in the prior art described above, and to overcome other limitations that will become apparent upon reading and understanding the present specification, the present invention discloses a variable resistance transducer responsive to an applied pressure, comprising a smooth resistive layer on a flexible substrate and deposited thereon small points of nonconductive or semiconductive material. The present invention utilizes a conventional resistive film layer having a smooth surface and a consistent resistivity, and employs printing and imaging technology to deposit a pattern of nonconducting or semiconducting points of relatively controllable, well-defined dimensions.

The nonconductive or semiconductive pattern may be deposited onto the smooth semiconductive layer in a number of ways. A photolithographic process may be employed wherein a thin coat of nonconductive photosensitive resin is deposited on the smooth semiconductive layer. The resin is then exposed with a laser printer or through a mask having the desired pattern of nonconductive points. The exposed areas are then either washed away or remain depending upon whether it is a positive or negative process.

A spray coat process may be utilized such as with an ink jet printer system wherein a photocurable insulating polymer is sprayed on in the desired pattern and then cured by light, heat, or by merely air drying.

Still yet another process which may be employed is a nonconductive or semiconductive toner system wherein the smooth resistive layer is processed through a photocopy machine, toner is applied where the nonconductive points are desired, and the toner is cured.

An advantage of the present invention is that manufacturing time and costs are lowered and accuracy increased by utilizing standard rolls of semiconductive film as the smooth resistive layer.

A feature of the present invention is that a highly automated and consistent photolithographic, spray coat, or toner system is used to impart the desired nonconductive pattern directly onto a smooth semiconductive sheet.

Another feature of the present invention is that a transparent nonconductive or semiconductive polymer may be deposited on a transparent roll of semiconductive film to form a transparent pressure sensitive transducer. The transducer may be fit over the screen of a computer and illuminated from the rear and is particularly useful in the construction of a XYZ digitizer pad.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of devices and methods of making same in accordance with the invention.

BRIEF DESCRIPTION OF THE DRAWINGS

Referring now to the drawings in which like reference numerals and letters indicate corresponding elements throughout the several views.

DETAILED DESCRIPTION OF THE PREFERRED EMBODIMENT

In the following description of the preferred embodiment, reference is made to the accompanying drawings which form a part hereof, and in which is shown by way of illustration specific embodiments in which the invention may be practiced and fabricated. It is to be understood that other embodiments and methods of making same may be utilized and structural changes may be made without departing from the scope of the present invention.

Figure 1:
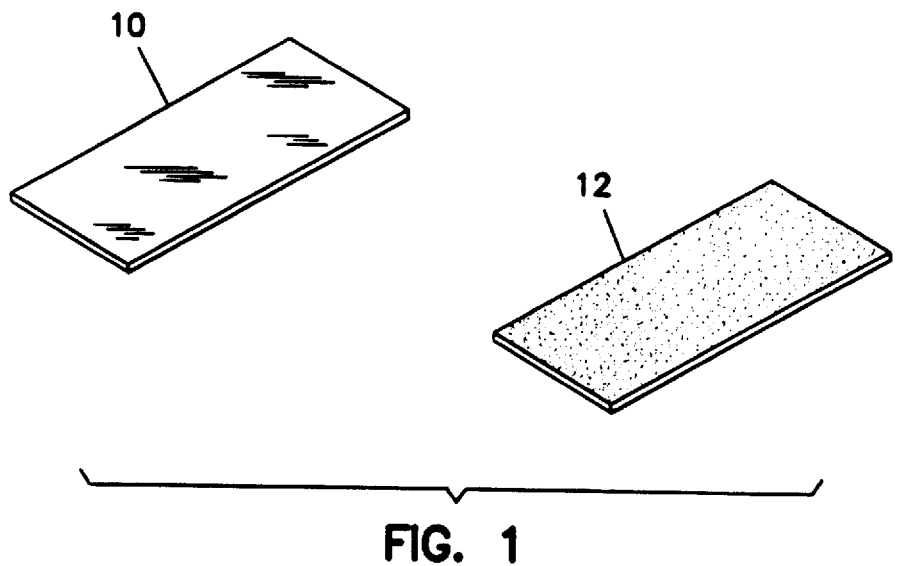
FIG. 1 depicts a smooth semiconductive layer having a pattern of nonconductive or semiconductive points deposited thereon in accordance with the principles of the present invention.

Reference is now made to FIG. 1 which depicts a general view of a smooth semiconductive layer and the layer having a pattern of nonconductive or semiconductive points deposited thereon. A semiconductive film 10 comprises a flexible polymer film coated with a relatively smooth resistive coating such as, but not limited to, carbon loaded resin or indium tin oxide. Those skilled in the art will be able to bring to mind other suitable semiconductive coatings for which the principles of the present invention may be practiced.

Many expedients are known for the film 10 including an indium tin oxide coated polyester under the trade name Intrex from the Sierracin Corporation of Sylmar, Calif. Other examples of the semiconductive film include, but are not limited to, MYLAR™ film coated with carbon loaded polymer or indium oxide or indium tin oxide. For the former materials, the carbon-loaded polymer is normally milled before coating in order to ensure the smoothness of the resulting surface. The coating may be done by a variety of standard methods including spraying, screening, or gravuring.

The semiconductive layer 10 is depicted in FIG. 1 with a pattern of nonconductive or semiconductive points deposited thereon as layer 12. The pattern may be a series of uniform circles or squares or may be a random distribution thereof, the specific pattern not essential for the understanding of the present invention.

Figure 2:
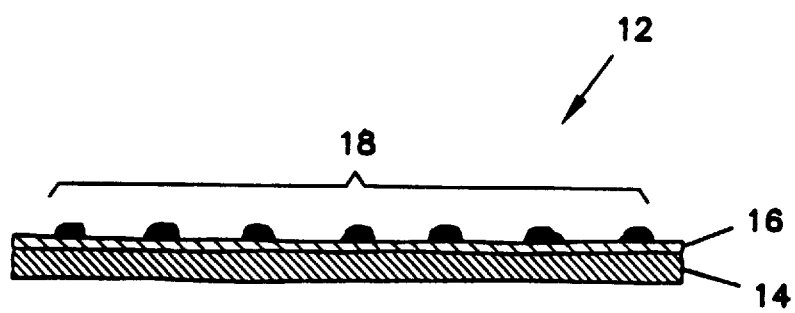
FIG. 2 depicts a greatly enlarged cutaway side view of the composite layer depicted in FIG. 1.

Reference is now made to FIG. 2 which depicts a greatly enlarged side cutaway view of the layer 12 depicted in FIG. 1. The base layer 14 is a flexible polymer such as polyester and has a smooth resistive layer 16 deposited thereon such as a carbon-filled resin or indium tin oxide. Disposed on top of layer 16 is the pattern of noncompressible, nonconducting or semiconducting points 18. In the preferred embodiment, the points 18 have a diameter or height on the order of one to ten microns. The points 18 are deposited on layer 16 by apparatus and methods described in more detail hereinbelow.

Figure 3A:
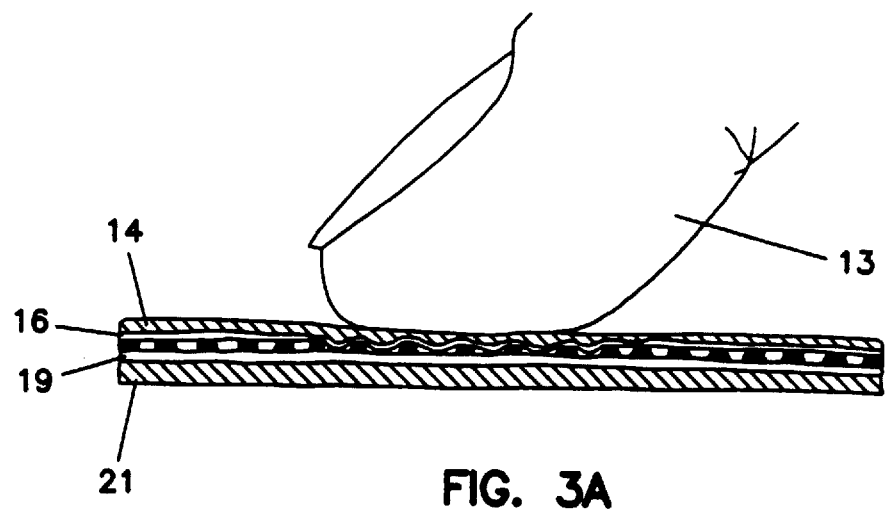
FIG. 3a and 3b depict side views of composite layers practiced in accordance with the principles of the present invention.

Reference is now made to FIG. 3a which depicts an exaggerated and greatly enlarged side view of a composite layer practiced in accordance with the principles of the present invention. A force is applied by finger 13 to base layer 14 causing the flexible semiconductive layer 16 to deform around points 18. The semiconductive layer 16 makes contact with a conductive or semiconductive layer 19 disposed on substrate 21 and below points 18. Points 18 are compressed between layers 16 and 19 and may deform themselves, although deformation of these points is not necessary for the operation of this invention.

Figure 3B:
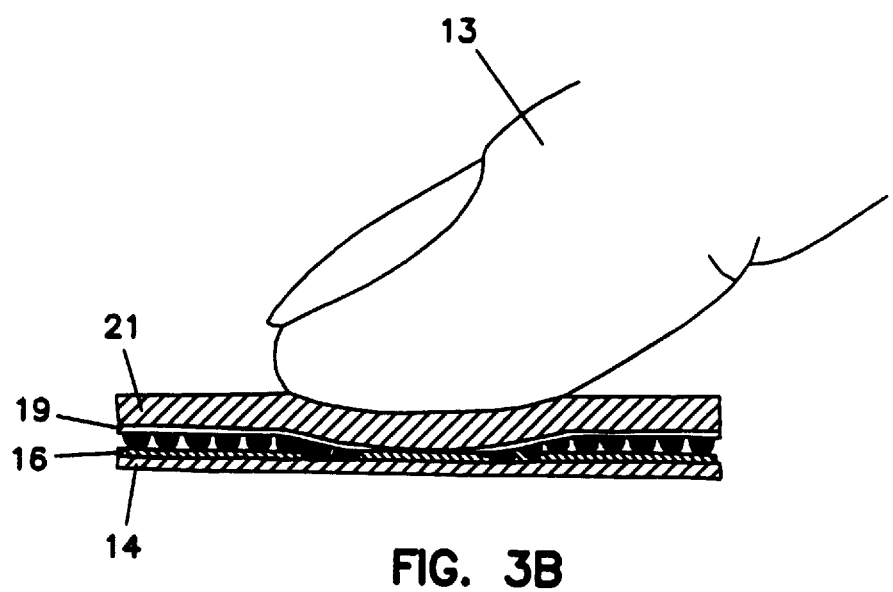

Reference is now made to FIG. 3b which depicts an exaggerated and greatly enlarged side view of yet another composite layer practiced in accordance with the principles of the present invention. A force is applied by finger 13 to substrate 21 causing the flexible conductive or semiconductive layer 19 to deform around points 18. The flexible conductive or semiconductive layer 19 makes contact with semiconductive layer 16. As discussed above with reference to FIG. 3a, points 18 are compressed between layers 16 and 19 and may deform themselves.

Figure 4:
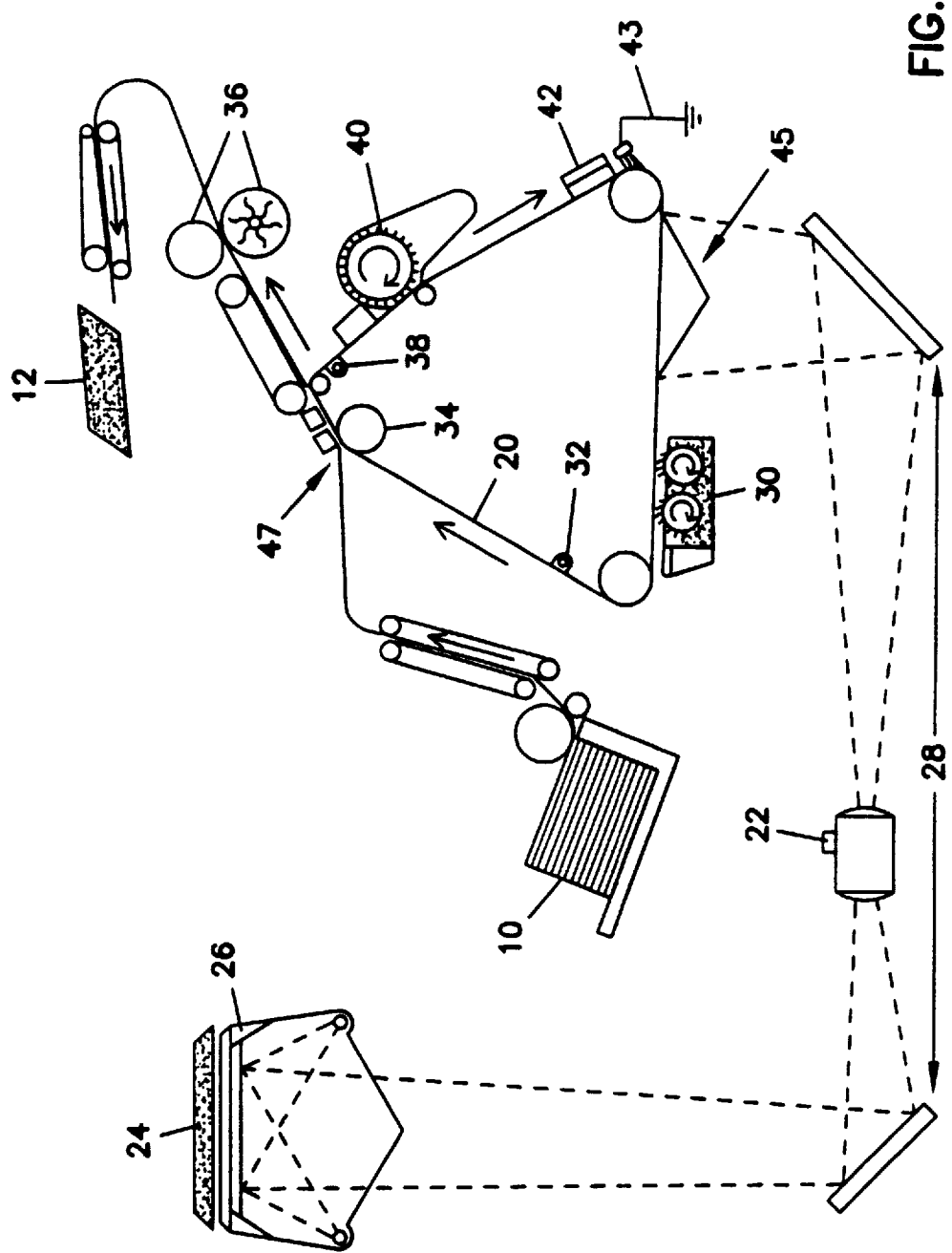
FIG. 4 depicts a xerographic apparatus adapted to fabricate the composite layer depicted in FIG. 2.

Reference is now made to FIG. 4 which depicts a xerographic apparatus adapted to fabricate the composite layer depicted in FIG. 2. A stack of sheets of semiconductive layer 10 are supplied by a series of rollers and belts which transfer the layer 10 to a photoconductive belt 20 which is charged to a high voltage. The belt 20 retains the charge on its surface for significant periods of time when it is not exposed to light. The belt 20 is typically charged by stretching a small diameter wire across and above its surface. The wire (not shown) is raised to a potential of several thousand volts creating a strong electrical field which separates the air molecules into negative and positive ions. Ions of the same potential as the negatively charged wire are repelled towards the belt 20 which is coated with a photoconducting surface and normally held to ground potential 43. As the belt moves into exposure position 45, a xenon lamp 22 flashes to illuminate a mask 24 disposed on platen 26 and having the desired pattern disposed on it. The black images on the mask 24 do not reflect the light while the non-imaging areas do.

An optical system 28, comprising of mirrors and lenses, focuses the reflective light from the mask 24 onto the charged belt 20 at exposure position 45. The light strikes the belt 20 and erases the charges leaving only those areas corresponding to the pattern on the mask 24 to remain charged.

At the toning station 30, toner particles charged to the opposite potential are brushed on the belt 20 and are attracted to the charged areas. The greater amount of charge in each area of the belt 20, the greater amount of toner attracted to it. This principle allows regulation of the height or diameter of the patterns to be disposed on layer 10.

The electric field of the belt 20 is relaxed by a post development lamp 32 and the semiconductive layer 10 is brought into contact with the belt 20 at position 47. A charge is laid down on the back of layer 10 by the transfer charger 34 to attract the toner particles onto the semiconductive layer 10. The layer 10 separates from the belt 20 and is carried to a hot roller fuser 36 which softens the toner particles and presses them onto the semiconductive layer 10. The belt recirculates and is erased by eraser lamp 38 and cleaned by cleaner 40 and finally returned to the primary charger 42 where it is ready to start another cycle.

The toner may be a standard nonconductive material commonly used with photocopy machines. It should be understood that many expedients for nonconductive and semiconductive toners are known, any one of which may be used without departing from the scope of the present invention.

It should be understood that a positive photolithographic process may be employed wherein a thin coat of nonconductive or semiconductive photosensitive resin such as isobornyl acrylate is deposited on the film 10 and the resin is exposed with a laser printer or through a mask having the desired pattern of nonconductive points. The unexposed resin is then removed with a chemical wash to leave the desired pattern of points. Similarly, a negative photolithographic process may be employed wherein the exposed photosensitive resin is removed leaving behind the desired pattern.

Figure 5:
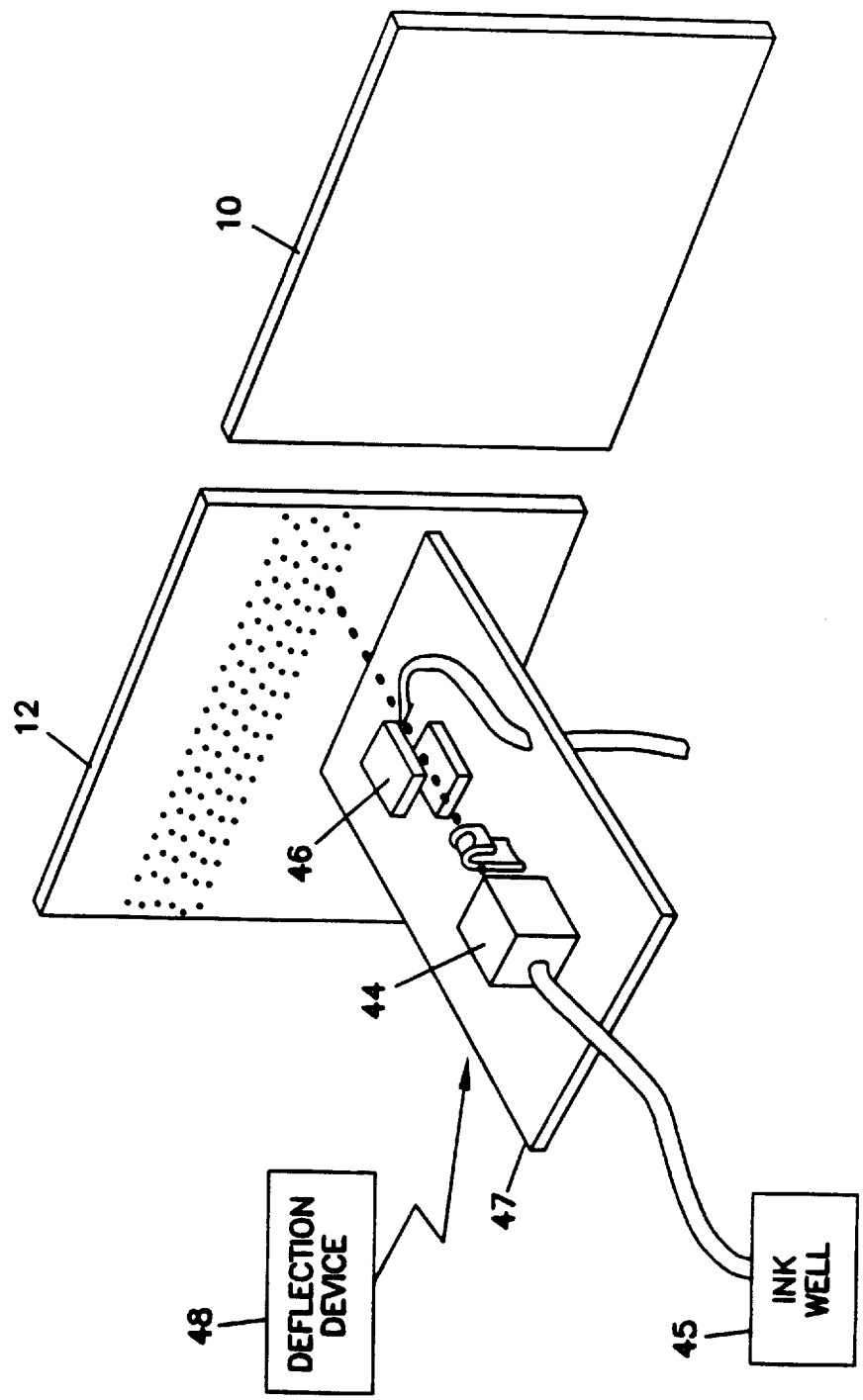
FIG. 5 depicts an ink jet apparatus adapted to fabricate the composite layer depicted in FIG. 2.

Reference is now made to FIG. 5 which depicts an ink jet apparatus adapted to fabricate a material practiced in accordance with the principles of the present invention. Nonconductive or semiconductive ink stored in an ink well 45 is ejected through a nozzle 44 under pressure and transformed into uniform droplets by vibration of a piezoelectric crystal 46. Examples of such nonconductive ink include those commonly used with ink jet printers. The ink droplets are deflected onto the semiconductive layer 10 to form layer 12 by a deflection device 48 which translates platform 47 in the XYZ directions. The height of the nonconductive points in the pattern are controlled by the size of the ink droplets through the nozzle 44 and by the velocity at which they contact the semiconductive layer 10.

In an alternative embodiment, the nozzle 44 may be controlled by the deflection device 48 much like an electron beam scans a television cathode ray tube to produce a picture. A second alternative embodiment employs a bank of nozzles in place of nozzle 44, each nozzle being digitally controlled by a central processing unit.

Figure 6:
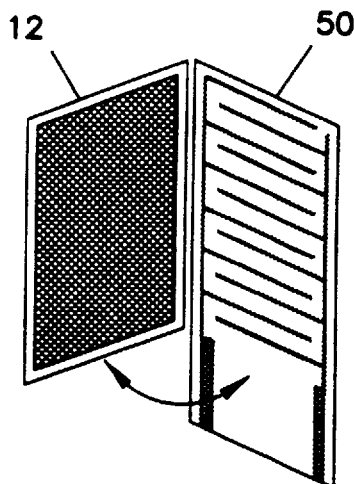
FIG. 6 depicts a first embodiment of a composition practiced in accordance with the principles of the present invention.

Reference is now made to FIG. 6 which depicts a first embodiment of a composition practiced in accordance with the principles of the present invention. The first layer 12 comprising a semiconducting material and having raised thereon nonconductive or semiconductive points is positioned adjacent a second layer 50. The second layer 50 is a polymer film or sheet having conducting or semiconducting interdigitating fingers or digitating fingers deposited thereon. Layers 12 and 50 face together so that the conducting fingers are shunted by the semiconducting layer 12 in response to an applied pressure. When no force is applied, the resistance between the interdigitating fingers is relatively large, preferably 1 megohm or more. With increasing force, the resistance drops following an approximate inverse power law $F \alpha R^{-1}$. The width and spacing of the finger pattern determines the force range over which the inverse proportionality holds. By varying the resistance of the semiconductor 12, the resistance range can be varied so that the device can be tailored for a specific application.

Figure 7:
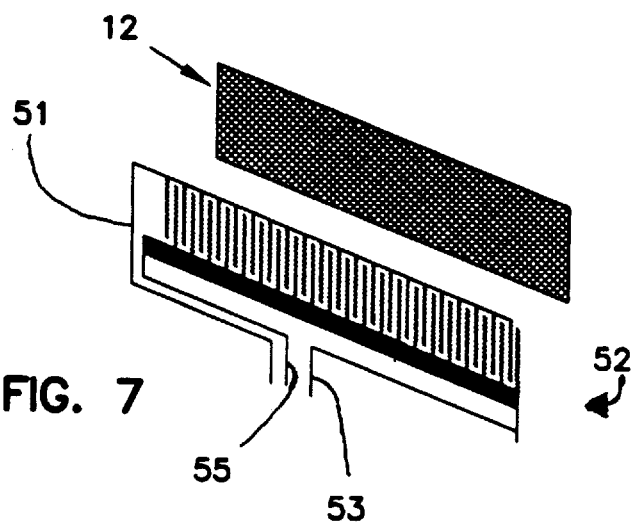
FIG. 7 depicts a second embodiment of a composition practiced in accordance with the principles of the present invention.

Reference is now made to FIG. 7 which depicts a second embodiment of a composition practiced in accordance with the principles of the present invention. The first layer 12 comprising a semiconducting material and having raised thereon nonconductive points is positioned adjacent to a second layer 52. The second layer 52 comprises a polymer film having resistive interdigitating fingers deposited thereon wherein one set of the fingers is a wiper arm 51 so that the position of the applied pressure on layer 12 can be sensed. A voltage is typically applied between the "hot" end 53 and the "ground" end 55 so that when force is applied to layer 12, the wiper arm 51 is shunted through that layer to one of the conducting resistive fingers. Thus, the voltage read between wiper 51 is proportional to the distance along the strip that the force is applied.

Figure 8:
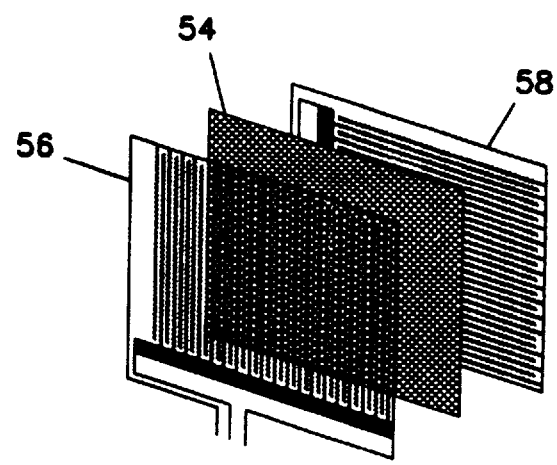
FIG. 8 depicts a third embodiment of a composition practiced in accordance with the principles of the present invention.

Reference is now made to FIG. 8 which depicts a third embodiment which may be practiced in accordance with the principles of the present invention. Layers 56, 54, and 58 comprise a transparent semiconductive material and are sandwiched together. The intermediate layer 54 comprises a dual sided semiconductive layer having a pattern of transparent nonconducting points deposited on both sides. Layer 56 comprises a polymer film having resistive or conductive interdigitating fingers deposited thereon wherein one of the fingers is a wiper arm and the digitating fingers span from top to bottom. Layer 58 is essentially layer 56 rotated 90 degrees so that the interdigitating fingers span from left to right.

By applying pressure to the sandwiched composition (56, 54 and 58), linear position of a point can be measured in two orthogonal directions. Thus, the position of a point on a plane can be completely specified in the X, Y and Z direction. The transparent composition may be positioned on a computer cathode ray tube without impeding the view of the user.

The foregoing description of the preferred embodiment of the invention has been presented for the purposes of illustration and description. It is not intended to be exhaustive or to limit the invention to the precise form disclosed. Any modifications and variations are possible in light of the above teaching. It is intended that the scope of the invention be limited not to this detailed description, but rather by the claims appended hereto.

What is claimed is:

1. A pressure sensitive potentiometer comprising:
   a first flexible layer having a smooth semiconducting surface and deposited thereon small raised points of nonconductive material; and
   a second layer adjacent the first layer and separated from the first layer by the raised points of nonconductive material, the second layer having a first and a second set of interdigitating resistive fingers, the first set of fingers being connected to a resistive bar portion running across the second layer perpendicular to the first and second set of fingers, the bar portion being coupled between a preselected voltage applied to first and second electrodes connected to respective ends of the bar portion, the second set of fingers being connected to a wiper arm running across the second layer parallel to the bar portion, wherein one of the second set of fingers, in response to an applied pressure to the first layer which causes the first layer to deform around the raised points of material thereby making contact with the second layer, is shunted by the first layer to one of the first set of fingers so that a voltage at an electrode connected to the wiper arm is proportional to a distance along which the pressure is applied.

2. A pressure sensitive transducer for measuring two orthogonal positions comprising:
   a first layer having a first and a second set of interdigitating resistive fingers spanning top to bottom, the first set of fingers being connected to a resistive bar portion running across the first layer perpendicular to the first and second set of fingers, the bar portion being coupled between a preselected voltage applied to first and second electrodes connected to respective ends of the bar portion, the second set of fingers being connected to a wiper arm running across the first layer parallel to the bar portion;

a second layer having a first and a second set of interdigitating resistive fingers spanning left to right, the first set of fingers being connected to a resistive bar portion running across the second layer perpendicular to the first and second set of fingers, the bar portion being coupled between a preselected voltage applied to first and second electrodes connected to respective ends of the bar portion, the second set of fingers being connected to a wiper arm running across the second layer parallel to the bar portion; and a third layer having a first and second side separated by a nonconducting material and having smooth semiconducting surfaces on each of its sides and deposited thereon small raised points of nonconductive material, and having regions of non-deposited material between the small raised points, the third layer being sandwiched between the first and second layers, and separated therebetween by the small points wherein one of the second set of fingers of the first layer in response to an applied pressure to the third layer is shunted by the third layer to one of the first set of fingers of the first layer so that a voltage at an electrode connected to the wiper arm of the first layer is proportional to a distance along which the pressure is applied top to bottom of the first layer;

wherein one of the second set of fingers of the second layer in response to an applied pressure to the third layer is shunted by the third layer to one of the first set of fingers of the second layer so that a voltage at an electrode connected to the wiper arm of the second layer is proportional to a distance along which the pressure is applied left to right of the second layer;

wherein the third layer is flexible and responsive to the applied pressure to deform around the raised points of material thereby making contact with the first and second layers in the regions between the deposited raised points.

3. A pressure sensitive transducer as recited in claim 2 wherein the first, second, and third layers are transparent.

* * * * *

UNITED STATES PATENT AND TRADEMARK OFFICE
CERTIFICATE OF CORRECTION

PATENT NO. : 5,847,639
DATED : December 8, 1998
INVENTOR(S) : Stuart I. Yaniger

On the title page, item [54], and Col.1, line 1:

It is certified that error appears in the above-identified patent and that said Letters Patent is hereby corrected as shown below:

On the title page, Item [54] and Column 1,

In the Title delete "LAND" and insert --AND--

Signed and Sealed this

Twenty-fifth Day of May, 1999

Attest:

Q. TODD DICKINSON

*Attesting Officer*  *Acting Commissioner of Patents and Trademarks*